United States Patent [19]

McMillan et al.

[11] 4,340,408

[45] Jul. 20, 1982

[54] HIGH SILICA GLASS

[75] Inventors: Peter W. McMillan, Leamington Spa; Ronald Maddison, Bedworth, both of England

[73] Assignee: National Research Development Corporation, London, England

[21] Appl. No.: 256,946

[22] Filed: Apr. 23, 1981

[30] Foreign Application Priority Data

Apr. 28, 1980 [GB] United Kingdom ............... 8013919

[51] Int. Cl.³ .................... C03C 15/00; C03C 3/06
[52] U.S. Cl. .................................. 65/31; 65/60.51
[58] Field of Search ................. 65/31,111, 60.51; 156/663; 427/255, 376.2

[56] References Cited

U.S. PATENT DOCUMENTS

| | | | |
|---|---|---|---|
| 1,918,117 | 7/1933 | Martin | 65/60.51 X |
| 3,113,008 | 12/1963 | Elmer | 156/663 X |
| 3,262,767 | 7/1966 | Wang | 65/31 |
| 3,438,803 | 4/1969 | Dubble et al. | 65/60.51 |
| 3,459,522 | 8/1969 | Elmer et al. | 65/111 X |
| 3,785,793 | 1/1974 | Park | 65/31 |
| 3,952,118 | 4/1976 | Novice | 65/60.51 X |
| 4,165,222 | 8/1979 | Panafieu et al. | 65/31 X |
| 4,261,722 | 4/1981 | Novak et al. | 65/60.51 X |

FOREIGN PATENT DOCUMENTS 54-107919 8/1979 Japan ..................... 65/60.51

*Primary Examiner*—Kenneth M. Schor
*Attorney, Agent, or Firm*—Stevens, Davis, Miller & Mosher

[57] ABSTRACT

A fully dense high silica glass is made by taking a silica glass, causing it to phase separate into two inter-connecting phases, then removing one phase to leave a porous high silica glass, forming a layer of metal oxide over the surface of the pores of the glass and finally sintering the metal oxide-coated porous glass. Preferably a titanium oxide layer is formed by first producing a layer of titanium chloride and then hydrolysing this layer to form a surface layer of titanium oxide. The formation of a metal oxide layer on the pores of the glass allows a lower process temperature to be used, for sintering and providing the fully dense high silica glass.

15 Claims, No Drawings

HIGH SILICA GLASS

The invention relates to the production of a fully dense high silica material.

The exceptional chemical and thermal durabilities of high silica glasses make them attractive materials for many applications. The melting temperatures of these glasses are high (~1900° C.) but they can be produced by a phase-separation and leaching process which avoids the high melting temperature. The intermediate porous glass produced during this process is sintered to produce the fully dense high silica glass. The process generally involves producing a relatively low melting temperature alkali-borosilicate glass, causing it to phase separate into two interconnecting phases, removing the soluble phase leaving a porous silica glass skeleton and subsequently sintering this to zero porosity. High silica glasses may be used for high temperature applications e.g. crucibles, mechanical supports where the temperature is in excess of 1000 C. as in supports for catalysts, and for uses requiring a material with a low thermal expansion.

The object of the present invention is to facilitate the production of a fully dense high silica glass made by the porous glass route by enabling lower temperature sintering to be applied to the porous glass than is possible using known production methods. The invention provides a method of producing fully dense high silica materials involving the steps of (a) making a porous silica glass by causing a glass to phase separate into two interconnecting phases and then removing one phase (b) forming a layer of a metal oxide over the surface of the porous glass and finally (c) sintering the oxide-covered porous glass.

The intermediate step of coating the surface of a porous glass with a metal oxide is described in copending UK patent application No. 8,013,918 which relates to porous glass membranes for use in reverse osmosis. By forming the metal oxide layer on the glass surface the sintering temperature of the glass is reduced by approximately 10%.

Preferably the metal oxide layer is formed by first treating the porous glass with a volatile metal chloride vapour and then hydrolising the treated glass to form the metal oxide. Advantageously the metal is titanium as the glass can be held at a relatively low temperature during the deposition of the titanium oxide layer.

The sintering process can be carried out in an oxidising atmosphere or a reducing atmosphere.

The invention will now be described by way of example only with reference to the production of a fully dense material from a parent glass of the composition 61.8 $SiO_2$, 27.5 $B_2O_3$, 7.1 $Na_2O$ and 3.6 wt. % $Al_2O_3$.

1. The preparation of the parent glass: glass of the composition given above was prepared from 'Analar' grade raw materials by melting at 1150° C. for 2 hours. This was then cast into blocks and sliced into 1 mm thick plates after annealing at 490° C. for 4 hours.

2. Inducing the required phase separation in the glass: the plates were heat treated in an oxidising atmosphere for 3 hours at 595° C.

3. The leaching of the glass to produce a porous skeleton: prior to leaching it was necessary to remove the silica rich layer on the glass surface by treating the glass in a 3 v/v % H.F. solution for 10 minutes. Following this the glass was leached in a 5 v/v % HCl solution saturated with ammonium chloride at 25° C. The soluble phase was completely removed from the glass after 48 hours in the leaching solution. After leaching the porous glass was washed in several changes of distilled water for 5 hours. This removed reaction products from the pores of the glass.

4. The application of a $TiO_2$ coating to the porous glass: the porous glass was first dried in the presence of flowing dry $N_2$ gas (2 lt/min) at 80° C. for 2 hours and then 200° C. for 2 hours. After this 2 ml of volatile $TiCl_4$ liquid was introduced into the $N_2$ stream and carried to the porous glass which was held at a temperature of 80° C. The chloride reacted with the chemically bonded hydroxyl groups present on the glass surface by the reaction.

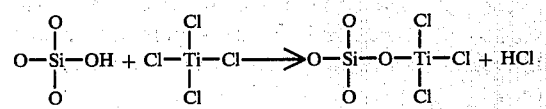

The remaining chlorine was then replaced with oxygen by introducing water vapour into the $N_2$ stream. This hydrolised the metal chloride and produced further HCl vapour.

5. The sintering of the treated glass: the treated glass was then fully sintered in an oxidising atmosphere by heat treatment at 850° C. for 30 minutes.

The advantage of this process is that the sintering of the metal oxide covered porous glass takes place at 850° C. in 30 minutes compared to the temperature of 980° C. required to sinter the untreated porous glass in the same time.

Other volatile liquid metal chlorides can be used to coat the intermediate porous glass. These must be applied to the glass at a temperature high enough to allow the bonding reaction. For example $SnCl_4$ must be applied at a temperature of at least 400° C. Treatment with other oxides causes similar reduction in the sintering temperature of the porous glass.

The sintering temperature of porous glass depends on the atmospheric conditions under which it takes place. To sinter the glass fully in a reducing atmosphere (e.g. forming gas: 90% $N_2$, 10% $H_2$) requires 1050° C. for 30 minutes and to fully sinter in a nitriding atmosphere (produced by bubbling $N_2$ through an ammonia solution) requires 1060° C. for 30 minutes. The treatment described above also reduces the sintering temperature in both of these atmospheres. In a reducing atmosphere the treated glass fully sinters at 1020° C. in 30 minutes and in a nitriding atmosphere it fully sinters at 900° C. in 30 minutes. Sintering in these two oxygen deficient atmospheres modifies the oxidation state of the metal oxide coating giving the fully dense material a metallic appearance. This metallic coating has been found to have semi-conducting properties with a measured bandgap of 0.4 eV.

Although the invention has been described with reference to one particular alkali-borosilicate glass it will be appreciated by those skilled in the art that it has application to other glasses and modifications of the invention will be readily apparent.

We claim:

1. A method for making a high silica glass comprising the steps of:

a. selecting a silica glass which can be separated into two interconnecting phase components;

b. treating the glass to phase separate it into said two interconnecting phase components and removing one phase component to leave a porous silica-rich glass component;

c. forming a layer of metal oxide over the surface of the porous glass; and d. sintering the metal oxide covered porous glass to a fully dense high silica glass wherein said metal oxide of step (c) is such that the step (d) sintering can be carried out at a temperature which is lower than the temperature required without the layer of said metal oxide being formed over the surface of the porous glass 2. A method for making a high silica glass is claimed in claim 1 wherein the porous silica-rich glass component is first treated with a metal chloride and the surface layer thus formed is hydrolysed to produce the metal oxide.

3. A method for making a high silica glass as claimed in claim 2 where the forming of a layer of metal oxide includes the steps of:
   a. drying the porous silica-rich glass component in a stream of nitrogen;
   b. introducing a volatile metal chloride into the stream of nitrogen to form a layer of the metal chloride on the surface of the glass pores;
   c. introducing water vapour into the stream of nitrogen to oxidise the metal chloride; and
   d. immersing the glass in water to rehydrate the surface.

4. A method for making a high silica glass as claimed in claim 3 wherein the sintering is carried out in an oxidising atmosphere.

5. A method for making a high silica glass as claimed in claim 4 wherein the glass is a sodium-boron-alumino silicate, the glass membrane being heated to cause it to separate into an acid insoluble silica-rich component and an acid soluble component, and a mineral acid used to remove the soluble component.

6. A method for making a high silica glass as claimed in claim 5 wherein the glass has the composition: 61.8 $SiO_2$, 27.5 $B_2O_3$, 7.1 $Na_2O$ and 3.6 weight % $Al_2O_3$.

7. A method for making a high silica glass as claimed in claim 6 where forming of the phase separated glass includes the steps of:
   a. casting the silica glass into a block;
   b. slicing the blocks into plates; and
   c. heating the plates in an oxidising atmosphere to induce the phase separation of the two glass components.

8. A method for making a high silica glass as claimed in claim 7 wherein providing the porous silica-rich glass component includes the further steps of:
   a. treating the glass surface to remove any silica-rich layer which is present; and then
   b. dissolving the soluble glass component by means of a hydrochloric acid solution saturated with ammonium chloride.

9. A method for making a high silica glass as claimed in claim 3 wherein the sintering is carried out in a nitriding atmosphere.

10. A method for making a high silica glass as claimed in claim 9 wherein the glass is a sodium-boron-alumino silicate, the glass membrane being heated to cause it to separate into an acid insoluble silica-rich component and an acid soluble component, and a mineral acid used to remove the soluble component.

11. A method for making a high silica glass as claimed in claim 10 wherein the glass has the composition: 61.8 $SiO_2$, 27.5 $B_2O_3$, 7.1 $Na_2O$ and 3.6 weight % $Al_2O_3$.

12. A method for making a high silica glass as claimed in claim 11 where forming of the phase separated glass includes the steps of:
   a. casting the silica glass into a block;
   b. slicing the blocks into plates; and
   c. heating the plates in an oxidising atmosphere to induce the phase separation of the two glass components.

13. A method for making a high silica glass as claimed in claim 12 wherein providing the porous silica-rich glass component includes the further steps of:
   a. treating the glass surface to remove any silica-rich layer which is present; and then
   b. dissolving the soluble glass component by means of a hydrochloric acid solution saturated with ammonium chloride.

14. A method for making a high silica glass as claimed in any one of claims 2 to 13 wherein, in order to form the layer of metal oxide, the porous silica-rich glass component is heated to a temperature at least 80° C. and titanium chloride is reacted with the glass to form a coating of titanium chloride on the surface of the pores.

15. A method for making a high silica glass as claimed in any one of claims 2 to 13 wherein, in order to form the layer of metal oxide, the porous silica-rich glass component is heated to at least 400° C. and tin chloride is reacted with the glass to form a coating tin chloride on the surface of the pores.

* * * * *